United States Patent [19]

Forester et al.

[11] Patent Number: 4,489,049
[45] Date of Patent: Dec. 18, 1984

[54] SOLID STATE HYDROGEN PUMPING AND STORAGE MATERIAL

[75] Inventors: Donald W. Forester, Springfield, Va.; Peter Lubitz, Takoma Park; Carmine Vittoria, Bowie, both of Md.

[73] Assignee: The United States of America as represented by the Secretary of the Navy, Washington, D.C.

[21] Appl. No.: 386,465

[22] Filed: Jun. 9, 1982

[51] Int. Cl.³ .............................. C01B 6/24
[52] U.S. Cl. ............................ 423/644; 420/900; 423/648 R; 428/626; 428/630; 428/670
[58] Field of Search .................. 423/644, 648 R; 420/900; 428/670, 626, 630

[56] References Cited

U.S. PATENT DOCUMENTS

| 4,173,625 | 11/1979 | Billings | 423/648 R |
| 4,242,315 | 12/1980 | Bruning et al. | 423/648 R |
| 4,249,654 | 2/1981 | Helversen | 423/648 R |

Primary Examiner—Herbert T. Carter
Attorney, Agent, or Firm—Robert F. Beers; William T. Ellis; Charles E. Krueger

[57] ABSTRACT

A solid-state hydrogen storage system. A layer of an amorphous binary metal alloy of a lanthanide and iron, nickel or cobalt is disposed on a suitable substrate and overcoated with palladium metal.

18 Claims, 2 Drawing Figures

SOLID STATE HYDROGEN PUMPING AND STORAGE MATERIAL

BACKGROUND OF THE INVENTION

This invention relates to hydrogen storage systems and more particuarly to a solid-state hydrogen storage system.

Hydrogen gas is attractive as a fuel for use in transportation systems because it has the highest density of energy per unit weight of any fuel and is non-polluting. Present methods of storing hydrogen are suitable for industrial uses but are inappropriate for use in transportation systems. Accordingly, systems for storing and pumping hydrogen are an important subject of research and development.

Hydrogen storage in solid materials, referred to as solid state storage hereinafter, is being developed as an alternative to more standard methods of storage such as storage in compression tanks. A great advantage of solid-state storage is the achievement of storage densities several times that of liquid hydrogen. Additionally, hydrogen stored in a solid is relatively safe to handle without the normal problems of fire and explosion.

Heretofore, most of the solid materials utilized for hydrogen storage have been crystalline solids. A major problem with those materials has been the high pressure required to overcome the surface energy barrier of the material in order to force hydrogen into the bulk thereof. Additional problems with crystalline materials include the requirement of high temperatures for discharging stored hydrogen from the solid materials and surface poisoning in the presence of atmospheric gases that reduces absorption and discharge rates.

OBJECTS OF THE INVENTION

Accordingly, an object of the present invention is to provide a solid-state hydrogen storage material that does not require high pressure for efficient absorbtion or high temperature for efficient discharge.

A further object of the present invention is to provide a solid-state hydrogen material that is not impaired by atmospheric exposure and that does not discharge hydrogen at room temperature.

SUMMARY

The above and other objects are achieved in the present invention which comprises a layer of an amorphous binary alloy of a lanthanide and iron, nickel or cobalt disposed on a suitable substrate and overcoated with a palladium metal layer. The present invention absorbs hydrogen at low pressures, resists surface poisoning, stores hydrogen at room temperature, and discharges hydrogen by heating the storage material to a relatively moderate temperature.

DETAILED DESCRIPTION OF THE PREFERRED EMBODIMENT

Figure 1:
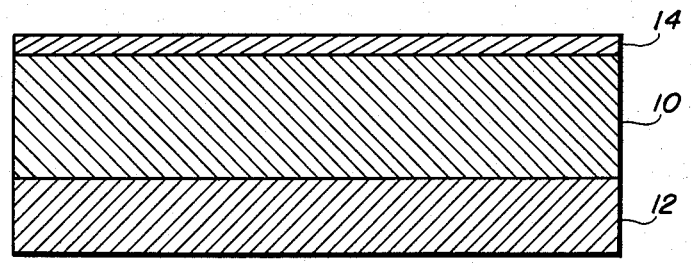
FIG. 1 is a cross-sectional view of a solid-state hydrogen storage material.

Referring to the Figure, the solid-state hydrogen storage material of the present invention is depicted. A storage layer of an amorphous binary metal alloy 10 is deposited on a substrate 12. The amorphous alloy is overcoated with a layer of palladium metal (Pd) 14.

Briefly, the hydrogen is absorbed through the palladium overcoat 14 and stored in the storage layer 10. The palladium overcoat 14 increases the absorption rate dramatically while inhibiting surface poisoning.

Suitable substrates for the storage layer include glass and plastic. The nature of the substrate is not critical to the invention because the amorphous alloy adheres to most surfaces. One particulary promising substrate is a thin plastic sheet, such as Mylar, that provides a very large surface area that can be enclosed in a small volume by folding the plastic sheet.

The amorphous binary metal alloy is composed of a lanthanide and either iron, nickel, or cobalt. The layer 10 of amorphous alloy may be deposited on the substrate by electron beam co-deposition at room temperature and with vacuum pressure in the $10^{-6}$ to $10^{-7}$ Torr range. However, any method of simultaneous, in vacuum deposition of the iron, nickel, or cobalt and lanthanide components of the amorphous alloy onto the substrate can be utilized. The overcoating of palladium may be similarly applied.

Actual tests were conducted employing a storage layer of an amorphous gadolinium-iron alloy (a-GdFe). The storage material was exposed to various gases including air. It was discovered that after such exposure a-GdFe without a palladium overcoat did not absorb hydrogen for pressures up to several thousand microns. However, a-GdFe overcoated with only 30 Angstroms of palladium absorbed hydrogen at a rapid rate, even after exposure to air. This high absorption rate was demonstrated at room temperature. Palladium overcoats of only 10 Angstroms were found to be effective.

The palladium overcoated a-Gd Fe storage layer demonstrated resistance to surface layer poisoning by atmospheric gases and the ability to absorb hydrogen at pressures below 100 microns.

Although absorption takes place at room temperature subsequent heating to 80° C. is sufficient to discharge most of the hydrogen from the alloy. Complete discharge of hydrogen is achieved at 180° C. The hydrogen absorption and discharge rates were verified by resistivity, magnetization, x-ray and ferromagnetic resonance measurements.

The thickness of the a-Gd Fe layer was varied from 1,000 Angstroms up to 35,000 Angstroms. It was found that for thicknesses above 35,000 Angstroms the storage layer would separate from the substrate due to expansion caused by hydrogen absorption.

The ratio of gadolinium to iron in the amorphous alloy is variable. Effective operation of Pd overcoated a-Gd Fe was obtained for gadolinium to iron ratios ranging from 2 to 1 (30% Fe) to 1 to 9 (90% Fe).

As stated above, the solid-state storage material absorbs hydrogen gas, at room temperature and at pressures below 100 microns. Thus, the storage material is ideally suited for use in high-vacuum hydrogen pumping systems. A hydrogen pumping system utilizing the present invention is depicted in FIG. 2.

Figure 2:
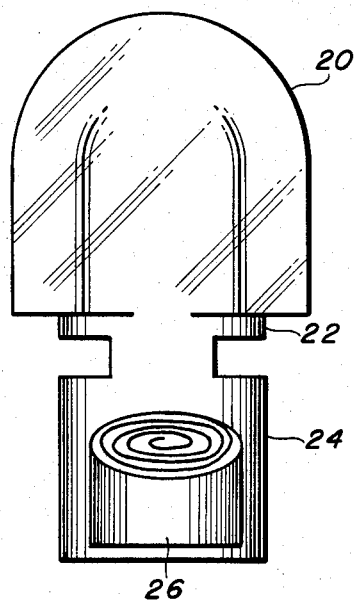
FIG. 2 is a schematic diagram of a hydrogen pumping system.

Turning now to FIG. 2, a vacuum chamber 20 is connected by a flange 22 to a pumping chamber 24 with multi-turn sheets of the storage material siutated therein. If the temperature of the storage material 26 is below 80° C. rapid absorption of hydrogen by the storage material will pump the hydrogen gas from the vacuum chamber 20.

The pumping capability of the storage material will decrease as it becomes saturated with hydrogen. However, the storage material may be reactivated by heating the storage material above 80 C. and flushing the pumping system with nitrogen or some other gas.

The above-described properties of a GdFe have also been observed for storage layers fabricated of either amorphous terbium-iron or dysprosium-iron alloys.

It is predicted that the properties described above for an embodiment of the invention with a storage layer of amorphous gadolinium iron alloy will also be present when any lanthanide is substituted for gadolinium. Basis for this prediction is the known hydrogen absorption properties of crystalline lanthanide-iron alloys and the observed increase in hydrogen absorbtion rates and resistance to surface poisoning of palladium overcoated alloys. Several tests have been performed that support the validity of the predicted utility of amorphous lanthanide iron alloys. As stated above, tests were conducted utilizing storage layers fabricated of amorphous terbium-iron and dysprosium-iron alloys. The deposition techniques, storage layer and palladium overcoat thicknesses, and lanthanide to iron ratios were the same as described above for an a-GdFe storage layer. The high absorption rate and storage capability at room temperature observed for a-GdFe was also observed for amorphous terbium-iron and dysprosium-iron alloys.

It is also predicted that cobalt and nickel may be substituted for iron. Basis for the prediction is the known hydrogen absorbtion properties of crystalline lanthanide-cobalt and lanthanide-nickel alloys.

The constituents of the amorphous binary alloy selected for a particular application will be determined by practical factors such as cost and availability.

Obviously, numerous (additional) modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A solid-state material for storing hydrogen comprising:
   a substrate suitable for the deposition of metal films;
   a storage layer film of an amorphous binary alloy of a lanthanide and a second metal selected from the group consisting of iron, nickel and cobalt, wherein said storage layer is disposed upon said substrate; and
   a palladium metal layer film overcoating said storage layer.

2. The solid-state material recited in claim 1 wherein: the thickness of said palladium metal layer is in the range of about 10 angstroms to about 30 angstroms.

3. The solid-state material recited in claim 2 wherein: the ratio of said lanthanide to said second metal in said amorphous binary alloy is in the range of about 2 to 1 to about 1 to 9.

4. The solid-state material recited in claim 3 wherein: the thickness of said storage layer is in the range of about 1,000 Angstroms to about 35,000 Angstroms.

5. The solid-state material recited in claim 4 wherein: said lanthanide is selected from the group consisting of gadolinium (Gd), terbium (Tb) and dysprosium (Dy).

6. The solid-state material recited in claim 5 wherein: said second metal is iron.

7. A solid-state material for storing hydrogen comprising:
   a substrate suitable for the deposition of metal films;
   a storage layer film of an amorphous binary alloy of iron and a lanthanide, wherein said storage layer is disposed on said substrate; and
   a palladium metal layer film overcoating said storage layer.

8. The solid-state material recited in claim 7 wherein: the thickness of said storage layer is in the range of about 1,000 Angstroms to about 35,000 Angstroms.

9. The solid-state material recited in claim 8 wherein: the thickness of said palladium layer is in the range of about 10 Angstroms to about 30 Angstroms.

10. The solid-state material recited in claim 9 wherein: the ratio of iron to said second metal is in the range of about 1 to 2 to 9 to 1.

11. The solid state material recited in claim 10 wherein: said lanthanide is selected from the group consisting of gadolinium (Gd), terbium (Tb) and dysprosium (Dy).

12. A method of scavenge pumping hydrogen gas from a chamber, said method comprising the steps of:
    producing a solid-state storage material comprising a substrate suitable for the deposition of metal film, a storage layer film of an amorphous binary alloy of a lanthanide and a second metal selected from the group of consisting of iron, nickel and cobalt, wherein said storage layer is disposed upon said substrate; and
    a palladium metal layer film overcoating said storage layer;
    exposing said hydrogen gas in said chamber to said solid state storage material wherein the temperature of said solid state storage material is less than about 80° C.,
    sealing said chamber from said solid state storage material; and
    discharging said hydrogen gas from said solid state storage material by heating said solid state storage material to a temperature above about 80° C.

13. A method of scavenge pumping hydrogen gas from a chamber as recited in claim 12, wherein said step of providing a solid state storage matferial comprises the step of:
    providing a storage material with a palladium metal layer film overcoating said storage layer to a thickness in the range of about 10 angstroms to about 30 angstroms.

14. A method of scavenge pumping hydrogen gas from a chamber as recited in claim 13, wherein said step of providing a solid state storage material comprises the step of:
    providing a storage layer having a ratio of said lanthanide to said second metal of about 2 to 1 to about 1 to 9.

15. A method of scavenge pumping hydrogen gas from a chamber as recited in claim 14, wherein said step of providing a solid state storage material comprises the step of:
    providing a storage layer having a thickness in the range of about 1,000 angstroms to about 35,000 angstroms.

16. A method of scavenge pumping hydrogen gas from a chamber as recited in claim 15, wherein said step of providing a solid state storage material comprises the step of:

selecting iron as said second metal.

17. A method of scavenge pumping hydrogen gas from a chamber as recited in claim 15, wherein said step of providing a solid state storage material comprises the step of:

selecting said lanthanide from the group of gadolinium (GD), terbium (Tb) and dysprosium (Dy).

18. A method of scavenge pumping hydrogen gas from a chamber as recited in claim 17 wherein said step of providing a solid state storage material comprises the step of:

selecting iron as said second metal.

* * * * *